United States Patent
Murata

(10) Patent No.: US 10,412,294 B2
(45) Date of Patent: Sep. 10, 2019

(54) IMAGE SENSOR AND IMAGE-CAPTURING DEVICE

(71) Applicant: NIKON CORPORATION, Tokyo (JP)

(72) Inventor: Hironobu Murata, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/642,686

(22) Filed: Jul. 6, 2017

(65) Prior Publication Data

US 2017/0302846 A1 Oct. 19, 2017

Related U.S. Application Data

(63) Continuation of application No. 14/405,196, filed as application No. PCT/JP2013/065216 on May 31, 2013, now abandoned.

(30) Foreign Application Priority Data

Jun. 6, 2012 (JP) .................................. 2012-129207

(51) Int. Cl.
| | |
|---|---|
| *H04N 5/369* | (2011.01) |
| *H04N 5/232* | (2006.01) |
| *G02B 7/34* | (2006.01) |
| *G03B 13/36* | (2006.01) |
| *H04N 9/04* | (2006.01) |

(52) U.S. Cl.
CPC ........... *H04N 5/23212* (2013.01); *G02B 7/34* (2013.01); *H04N 5/3696* (2013.01); *G03B 13/36* (2013.01); *H04N 9/045* (2013.01)

(58) Field of Classification Search
CPC .. H04N 5/23212; H04N 5/3696; H04N 9/045; G02B 7/34; G03B 13/36
See application file for complete search history.

(56) References Cited

U.S. PATENT DOCUMENTS

2007/0098381 A1*  5/2007  Oshima ................ H04N 3/1575
                                                              396/52
2010/0091161 A1   4/2010  Suzuki
2010/0188532 A1   7/2010  Kusaka et al.
(Continued)

FOREIGN PATENT DOCUMENTS

CN       101918873 A    12/2010
EP         2164269 A1     3/2010
(Continued)

OTHER PUBLICATIONS

Jun. 27, 2017 Office Action issued in Japanese Application No. 2016-135031.
(Continued)

*Primary Examiner* — Roberto Velez
*Assistant Examiner* — Tuan H Le
(74) *Attorney, Agent, or Firm* — Oliff PLC

(57) ABSTRACT

An image sensor includes: a plurality of light receiving units arranged along a first direction and along a second direction different from the first direction in a two-dimensional array; and a light receiving unit arranged at a central position among four light receiving units set next to each other along the first direction and the second direction among the plurality of light receiving units, which includes a light shielding member arranged over part thereof.

17 Claims, 10 Drawing Sheets

(56) References Cited

U.S. PATENT DOCUMENTS

| | | | |
|---|---|---|---|
| 2010/0214453 A1* | 8/2010 | Murata | G02B 3/0056 348/266 |
| 2010/0302433 A1 | 12/2010 | Egawa | |
| 2010/0309351 A1* | 12/2010 | Smith | H04N 5/335 348/280 |
| 2011/0052095 A1* | 3/2011 | Deever | G06T 3/4076 382/300 |
| 2011/0058075 A1* | 3/2011 | Yanagita | H01L 27/14621 348/273 |
| 2011/0076001 A1 | 3/2011 | Iwasaki | |
| 2011/0205423 A1* | 8/2011 | Tsukada | G02B 7/38 348/345 |
| 2011/0234861 A1 | 9/2011 | Endo | |
| 2011/0273599 A1 | 11/2011 | Murata | |
| 2011/0273602 A1 | 11/2011 | Takamiya et al. | |
| 2012/0242874 A1* | 9/2012 | Noudo | H01L 27/14623 348/294 |
| 2012/0268613 A1* | 10/2012 | Nishio | G02B 7/346 348/208.5 |
| 2012/0300102 A1* | 11/2012 | Tamura | H01L 27/14607 348/294 |
| 2013/0050523 A1 | 2/2013 | Kodama et al. | |

FOREIGN PATENT DOCUMENTS

| | | |
|---|---|---|
| JP | H06-77450 A | 3/1994 |
| JP | 2002-289828 A | 10/2002 |
| JP | 2008-312073 A | 12/2008 |
| JP | 2009-063952 A | 3/2009 |
| JP | 2010-210903 A | 9/2010 |
| JP | 2010-220192 A | 9/2010 |
| JP | 2011-077770 A | 4/2011 |
| JP | 2011-077829 A | 4/2011 |
| JP | 2011-176714 A | 9/2011 |
| JP | 2011-223264 A | 11/2011 |
| JP | 2011-250325 A | 12/2011 |

OTHER PUBLICATIONS

Aug. 27, 2013 International Search Report issued in International Application No. PCT/JP2013/065216.
Feb. 28, 2017 Office Action issued in Japanese Application No. 2016-135031.
Jun. 13, 2016 Office Action issued in U.S. Appl. No. 14/405,196.
Feb. 6, 2017 Office Action issued in U.S. Appl. No. 14/405,196.
May 3, 2017 Office Action issued in Chinese Application No. 201380040496.9.
Apr. 3, 2018 Office Action issued in Chinese Patent Application No. 201380040496.9.
Feb. 26, 2019 Office Action issued in Japanese Application No. 2018-065019.
Jul. 18, 2018 Office Action issued in Indian Patent Application No. 52/DELNP/2015.
Feb. 27, 2019 Office Action issued in Chinese Patent Application No. 201380040496.9.

* cited by examiner

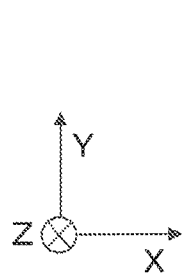 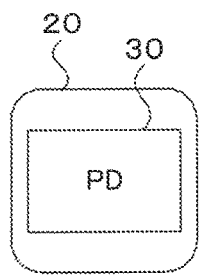 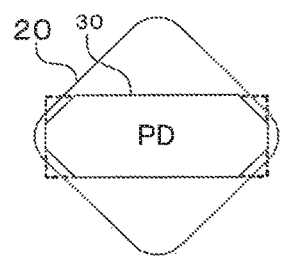
FIG. 2A  FIG. 2B

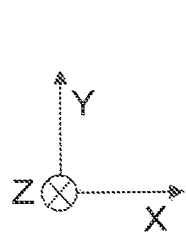
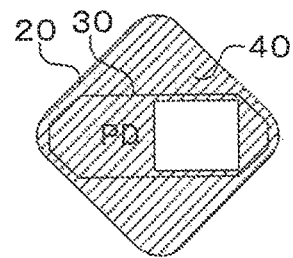
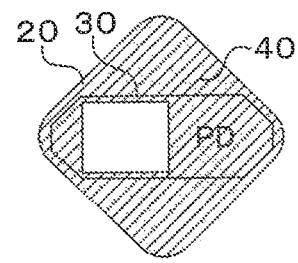
FIG. 3A    FIG. 3B

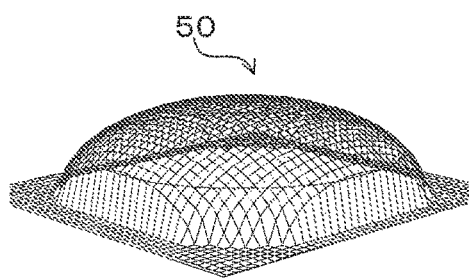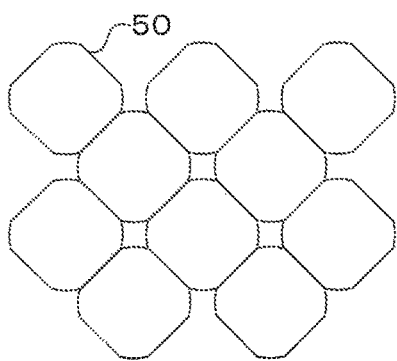
FIG. 4A
FIG. 4B

IMAGE SENSOR AND IMAGE-CAPTURING DEVICE

This application is a continuation of U.S. patent application Ser. No. 14/405,196, filed Apr. 24, 2015, which is the U.S. National Phase of PCT/JP2013/065216, filed May 31, 2013, which claims priority from Japanese Patent Application No. 2012-129207, filed Jun. 6, 2012, the entire disclosure of which is incorporated herein by reference hereto.

BACKGROUND

The present invention relates to an image sensor and an image-capturing device.

An image-capturing device is known which performs focus detection by a split-pupil phase detection method based upon output signals from a plurality of pixels dedicated for focus detection arranged on a part of an image sensor (see Japanese Laid Open Patent Publication No. 2011-77770).

SUMMARY

The focus detection pixels in the related art are arranged at positions separated from one another, and thus the focus detection accuracy will be lower compared to focus detection pixels arranged at successive positions. However, there is an issue in that if focus detection pixels in the related art were arranged at successive positions, the interpolation processing executed to generate image signals in correspondence to the positions at which the focus detection pixels are arranged would become complicated.

According to the first aspect of the present invention, an image sensor comprises: a plurality of light receiving units arranged along a first direction and along a second direction different from the first direction in a two-dimensional array; and a light receiving unit arranged at a central position among four light receiving units set next to each other along the first direction and the second direction among the plurality of light receiving units, which includes a light shielding member arranged over part thereof.

According to the second aspect of the present invention, in the image sensor according to the first aspect, it is preferred that the light receiving unit having the light shielding member arranged over part thereof is a light receiving unit used for purposes of focus detection.

According to the third aspect of the present invention, an image sensor comprises: a pixel group including a plurality of pixels that receive light fluxes having passed through an image-capturing optical system, wherein: the pixel group includes first pixels, second pixels and third pixels respectively assuming first spectral sensitivity, second spectral sensitivity and third spectral sensitivity different from one another; a plurality of first pixel rows, each including a plurality of first pixels arranged one after another along a first direction, and a plurality of second pixel rows, each including a plurality of second pixels and a plurality of third pixels arranged at alternate positions along the first direction, are arranged at alternate positions along a second direction running perpendicular to the first direction; the first pixel rows are offset relative to the second pixel rows along the first direction by an extent approximately equal to a half pitch; a plurality of focus detection pixels assuming the first spectral sensitivity are arranged in place of at least some of the first pixels in at least some of the plurality of first pixel rows; and the plurality of focus detection pixels receive a pair of light fluxes having passed through a pair of areas of a pupil of the image-capturing optical system and output a pair of image signals corresponding to a pair of images formed with the pair of light fluxes.

According to the fourth aspect of the present invention, an image sensor comprises: a pixel group including a plurality of pixels that receive light fluxes having passed through an image-capturing optical system, wherein: the pixel group includes first pixels, second pixels and third pixels respectively assuming first spectral sensitivity, second spectral sensitivity and third spectral sensitivity different from one another; a plurality of pixel row sets, each containing a first pixel row including a plurality of first pixels arranged one after another along a second direction, a second pixel row arranged immediately rightward relative to the first pixel row and including a plurality of second pixels arranged one after another along the second direction, a third pixel row arranged immediately rightward relative to the second pixel row and including a plurality of first pixels arranged one after another along the second direction and a fourth pixel row arranged immediately rightward relative to the third pixel row and including a plurality of third pixels arranged one after another along the second direction, are set one after another along a first direction running perpendicular to the second direction; each pixel row among the first through fourth pixel rows is arranged with an offset relative to an adjacent pixel row by an extent equal to a half pitch along the second direction; a plurality of focus detection pixels assuming the first spectral sensitivity are arranged in place of at least some of the first pixels in at least some of the plurality of first pixel rows and the plurality of third pixel rows; and the plurality of focus detection pixels receive a pair of light fluxes having passed through a pair of areas of a pupil of the image-capturing optical system and output a pair of image signals corresponding to a pair of images formed with the pair of light fluxes.

According to the fifth aspect of the present invention, in the image sensor according to the third or fourth aspect, it is preferred that the first pixels each include a green color filter, the second pixels each include a blue color filter and the third pixels each include a red color filter.

According to the sixth aspect of the present invention, in the image sensor according to any one of the third through fifth aspects, it is preferred that the pixels each assume a polygonal shape, in a plan view, which includes four sides inclining by approximately 45° relative to the first direction.

According to the seventh aspect of the present invention, in the image sensor according to any one of the third through sixth aspects, it is preferred that the focus detection pixels are arranged in place of all the first pixels.

According to the eighth aspect of the present invention, an image-capturing device comprises: an image sensor according to any one of the third through seventh aspects; an image generation unit that generates image signals based upon output signals provided from the image sensor; and a focus detection unit that detects a focusing condition at the image-capturing optical system based upon output signals provided from the image sensor.

According to the ninth aspect of the present invention, an image-capturing device comprises: an image sensor according to the fifth aspect; an adding unit that adds together output signals from two first pixels arranged next to each other along the first direction, adds together output signals from two second pixels arranged next to each other along the second direction and adds together output signals from two third pixels arranged next to each other along the second direction so as to output Bayer array signals; and an image generation unit that generates image signals corresponding to images formed with light fluxes having passed through the image-capturing optical system based upon the Bayer array signals output by the adding unit.

According to the tenth aspect of the present invention, in the image-capturing device according to the ninth aspect, it is preferred that: the focus detection pixels at the image sensor include a plurality of first focus detection pixels that receive one of the pair of light fluxes and a plurality of second focus detection pixels that receive the other of the pair of light fluxes, and the first focus detection pixels and the second focus detection pixels are arranged at alternate positions; the adding unit outputs multiplication result signals each obtained by adding together output signals from a first focus detection pixel and a second focus detection pixel set next to each other along the first direction and multiplying a signal resulting from addition by a predetermined factor; and the image generation unit generates the image signals based upon the Bayer array signals output from the adding unit and the multiplication result signals.

According to the present invention, better focus detection accuracy is assured without complicating the interpolation processing executed so as to generate image signals at the positions taken up by the focus detection pixels.

BRIEF DESCRIPTION OF THE DRAWINGS

FIGS. 2(A) and 2(B) illustrate unit pixels in the image sensor;

FIGS. 3(A) and 3(B) illustrate unit pixels in the image sensor;

FIGS. 4(A) and 4(B) illustrate micro-lenses;

DETAILED DESCRIPTION OF THE EMBODIMENTS

Figure 1:
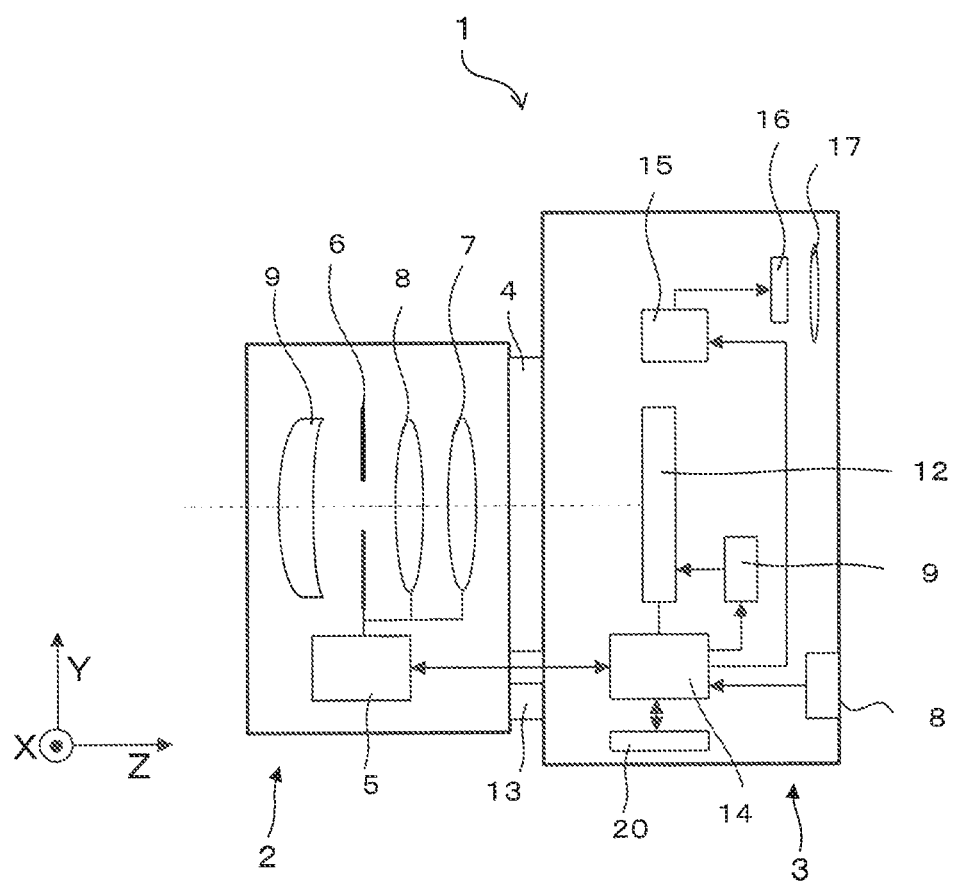
FIG. 1 illustrates an example of a structure that may be adopted in a digital camera achieved in an embodiment of the present invention.

The following is a description of an embodiment of the present invention, given in reference to drawings. An X direction, a Y direction and a Z direction in the following description and the drawings respectively run along the horizontal direction, the vertical direction and the front/rear direction. FIG. 1 illustrates an example of a structure that may be adopted in a digital camera according to an embodiment of the present invention. The digital camera 1 comprises an interchangeable lens 2 and a camera body 3. The interchangeable lens 2 is mounted at the camera body 3 via a mount unit 4.

The interchangeable lens 2 includes a lens control unit 5, a main lens 9, a zooming lens 8, a focusing lens 7 and an aperture 6. The lens control unit 5, which includes a microcomputer, a memory and the like, executes drive control for the focusing lens 7 and the aperture 6, detects the opening condition at the aperture 6, detects the positions of the zooming lens 8 and the focusing lens 7, transmits lens information to a body control unit 14 located in the camera body 3, as will be described later, receives camera information from the body control unit 14, and the like.

An image sensor 12, an image sensor drive control unit 19, the body control unit 14, a liquid crystal display element drive circuit 15, a liquid crystal display element 16, an eyepiece lens 17, operation members 18 and the like are arranged at the camera body 3. A detachable memory card 20 is loaded in the camera body 3. The image sensor 12, which may be a CCD image sensor or a CMOS image sensor, is arranged at a predetermined image-forming plane of the interchangeable lens 2 and captures a subject image formed via the interchangeable lens 2.

The body control unit 14 includes a microcomputer, a memory and the like. The body control unit 14 executes overall operational control of the digital camera. The body control unit 14 and the lens control unit 5 are configured so as to be able to communicate with each other via an electrical contact point 13 at the mount unit 4.

The image sensor drive control unit 19 generates a control signal, which is as required at the image sensor 12, in response to an instruction issued by the body control unit 14. The liquid crystal display element drive circuit. 15 drives the liquid crystal display element 16 configuring a liquid crystal viewfinder (EVF: electronic viewfinder) in response to an instruction issued by the body control unit 14. The photographer views an image displayed at the liquid crystal display element 16 via the eyepiece lens 17. The memory card 20 is a storage medium where image data and the like are stored.

The subject image formed on the image sensor 12 via the interchangeable lens 2 undergoes photoelectric conversion at the image sensor 12. The timing with which photoelectric conversion signals are stored and read out (the frame rate) at the image sensor 12 is controlled based upon the control signal provided by the image sensor drive control unit 19. Signals output from the image sensor 12 are converted to digital data at an A/D conversion unit (not illustrated) and the digital data resulting from the conversion are provided to the body control unit 14.

The body control unit 14 calculates a defocus quantity based upon output signals, which correspond to a specific focus detection area, provided from the image sensor, and transmits the defocus quantity to the lens control unit 5. Based upon the defocus quantity received from the body control unit 14, the lens control unit 5 calculates a focusing lens drive quantity, and drives the focusing lens 7 via a motor (not illustrated) or the like based upon the lens drive quantity so as to move the focusing lens 7 to the focus match position.

In addition, the body control unit 14 generates, based upon signals output from the image sensor 17 in response to a photographing instruction, image data to be recorded. The body control unit 14 stores the image data thus generated into the memory card 20 and also provides the image data to the liquid crystal display element drive circuit 15 so as to display a reproduced image corresponding to the image data at the liquid crystal display element 16.

It is to be noted that the operation members 18, including a shutter release button, a focus detection area setting member and the like, are also located at the camera body 3. The body control unit 14 detects operation signals output from the operation members 18 and controls operations (photographing processing, focus detection area setting and the like) corresponding to the detection results.

Description of the Image Sensor

The following explanation will focus on the image sensor 12. First, the method adopted when forming unit pixels 20 of the image sensor 12 will be described. As FIG. 2(A) illustrates, the unit pixels 20 each assume a substantially square shape, designed to achieve a predetermined size, and they each include a rectangular photoelectric conversion unit (PD) 30. As FIG. 2(B) indicates, each unit pixel 20 is arranged with a specific orientation achieved by rotating it so that its sides incline at an approximately 45° angle relative to the X direction and the Y direction. It is to be noted that the photoelectric conversion unit 30 is arranged while the photoelectric conversion unit 30 is not rotated and its aspect ratio is altered. In addition, in order to ensure that the area of this photoelectric conversion unit 30 remains the same as the area of the photoelectric conversion unit 30 illustrated in FIG. 2(A), the four corners of the photoelectric conversion unit 30 are rounded off in correspondence to the shape of the unit pixel 20. A transistor (not illustrated) is arranged in the unit pixel 20.

Two different types of unit pixels 20, i.e., pixels used for the purpose of focus detection (hereafter referred to as focus detection pixels), and pixels other than focus detection pixels (hereafter referred to as image-capturing pixels) are arranged at the image sensor 12. Half of the photoelectric conversion unit 30 at a focus detection pixel is shielded or covered with, for instance, a light shielding metal film 40 or the like and thus, only the other half of the photoelectric conversion unit 30 is left unshielded or open, as illustrated in FIGS. 3(A) and 3(B). It is to be noted that unit pixels 20, each having the right half of its photoelectric conversion unit 30 left unshielded (hereafter referred to as right-opening focus detection pixels), as illustrated in FIG. 3(A), and unit pixels 20, each having the left half of its photoelectric conversion unit 30 left unshielded (hereafter referred to as left-opening focus detection pixels), as illustrated in FIG. 3(B), are provided as focus detection pixels.

Subsequently, the unit pixels 20 undergo a wiring process and a flattening process of the known art, and then color filter layers are arranged at the unit pixels 20. A color filter layer, through which only the red color component of the light is transmitted, is arranged at an image-capturing pixel (R pixel) that is to receive the red color component light. A color filter layer, through which only the green color component of the light is transmitted, is arranged at an image-capturing pixel (G pixel) that is to receive the green color component light. A color filter layer, through which only the blue color component of the light is transmitted, is arranged at an image-capturing pixel (B pixel) that is to receive the blue color component light. In addition, a color filter layer through which only the green color component of light is transmitted is arranged at a focus detection pixel. Namely the focus detection pixels receive the green color component light alone.

Following the color filter layer formation, the unit pixels 20 undergo an on-chip lens formation process so as to form micro-lenses at the unit pixels 20. The micro-lenses arranged at the unit pixels 20 in the embodiment assume a shape achieved by cutting a round spherical lens on four sides, as illustrated in FIG. 4(A). Since micro-lenses 50 assuming such a shape can be arranged in a denser array, as illustrated in FIG. 4(B), the lens openings can be widened.

Figure 5:
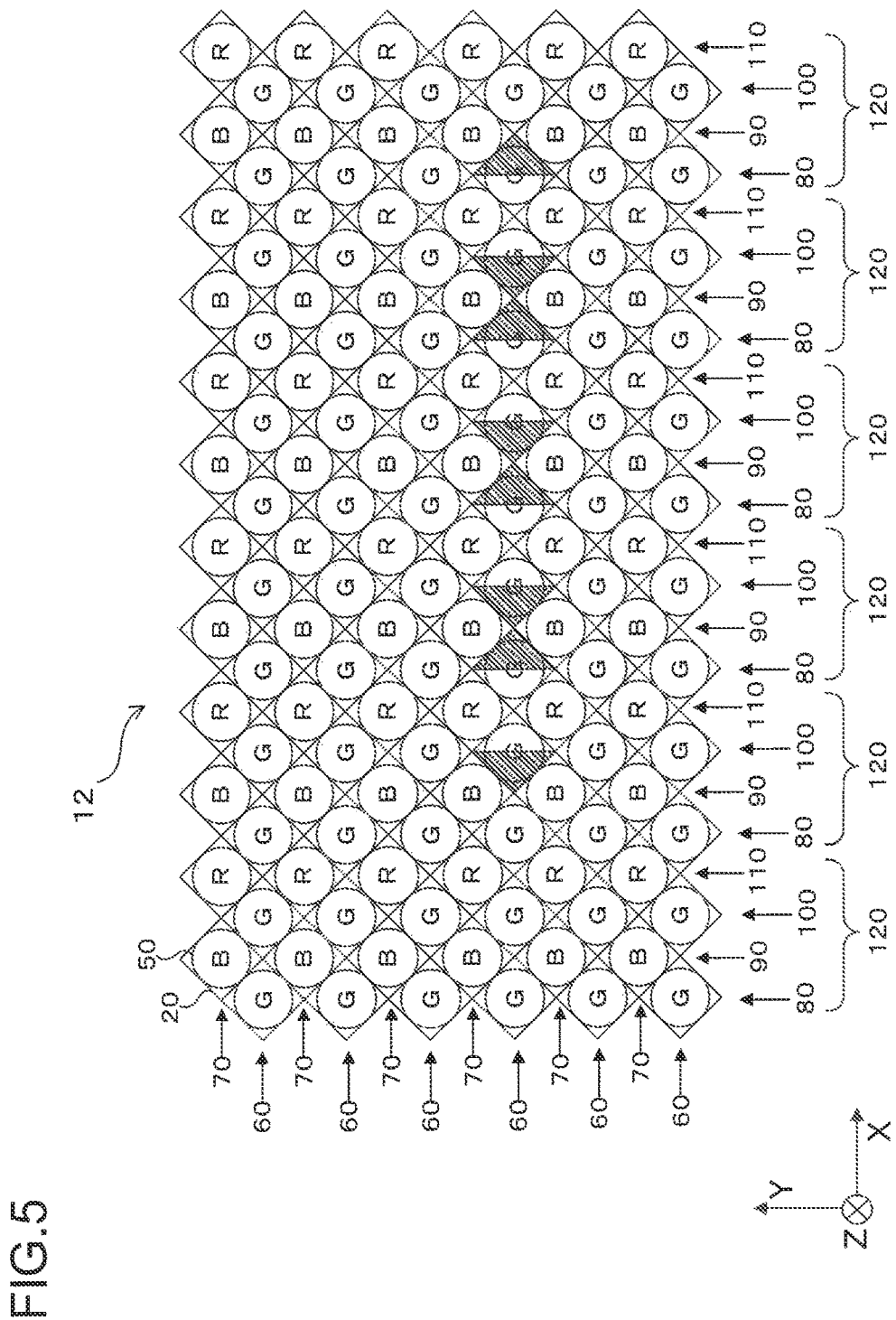
FIG. 5 is a plan view presenting an example of a positional arrangement with which pixels may be arranged in the image sensor.

Next, in reference to FIG. 5, the positional arrangement with which the pixels are arranged at the image sensor 12 will be described. It is to be noted that FIG. 5 illustrates only part of the image sensor 12. In addition, the pixels, each having the left half or the right half thereof shaded in FIG. 5, are focus detection pixels. A pixel with the left half thereof shaded is a right-opening focus detection pixel, whereas a pixel with the right half thereof shaded is a left-opening focus detection pixel. In addition, while FIG. 5 illustrates the micro-lenses 50 as round members in order to simplify the illustration, the actual micro-lenses 50 assume the shape illustrated in FIG. 4(B).

The image sensor 12 includes first pixel rows 60, each made up with a plurality of U pixels arranged along the X direction with a predetermined pitch, and second pixel rows 70, each made up with a plurality of B pixels and a plurality of R pixels, arranged at alternate positions along the X direction with the predetermined pitch. The plurality of first pixel rows 60 and the plurality of second pixel rows 70 are arranged at alternate positions along the Y direction with the predetermined pitch. In addition, a first pixel row 60 and an adjacent second pixel row 70 are arranged with an offset relative to each other along the X direction by an extent equal to half the predetermined pitch. As explained earlier, the unit pixels 20 are each arranged so that its sides all incline at approximately 45° relative to the X direction and the Y direction and thus, by arranging adjacent pixel rows with an offset to an extent equivalent to half the predetermined pitch, the plurality of unit pixels 20 can be arranged in a dense array.

This positional arrangement adopted for the pixels may be re-phrased as follows. The image sensor 12 includes third pixel rows 80, each made up with a plurality of G pixels arranged along the Y direction with a predetermined pitch, fourth pixel rows 90, each made up with a plurality of B pixels arranged along the Y direction with the predetermined pitch, fifth pixel rows 100, each made up with a plurality of G pixels arranged along the Y direction with the predetermined pitch, and sixth pixel rows 110, each made up with a plurality of R pixels arranged along the Y direction with the predetermined pitch. A fourth pixel row 90 is arranged directly rightward relative to a third pixel row 80, a fifth pixel row 100 is arranged directly rightward relative to the fourth pixel row 90, and a sixth pixel row 110 is arranged directly rightward relative to the fifth pixel row 100. The third through sixth pixel rows 80 through 110 are each arranged with an offset relative to the adjacent pixel rows along the Y direction by an extent equivalent to half the predetermined pitch. At the image sensor 12, a plurality of sets of pixel rows, each formed with a third pixel row 80 through a sixth pixel row 110, are arranged side-by-side along the X direction.

In addition, in some of the plurality of first pixel rows 60, a plurality of right-opening focus detection pixels and left-opening focus detection pixels are arranged in place of some of the G pixels. In other words, at some third pixel rows 80 and fifth pixel rows 100 among the plurality of third pixel rows 80 and the plurality of fifth pixel rows 100, a plurality of right-opening focus detection pixels and left-opening focus detection pixels are arranged in place of some of the G pixels. The plurality of right-opening focus detection pixels and left-opening focus detection pixels are arranged successively at alternate positions along the X direction within a specific focus detection area.

(Focus Detection Processing)

Figure 6:
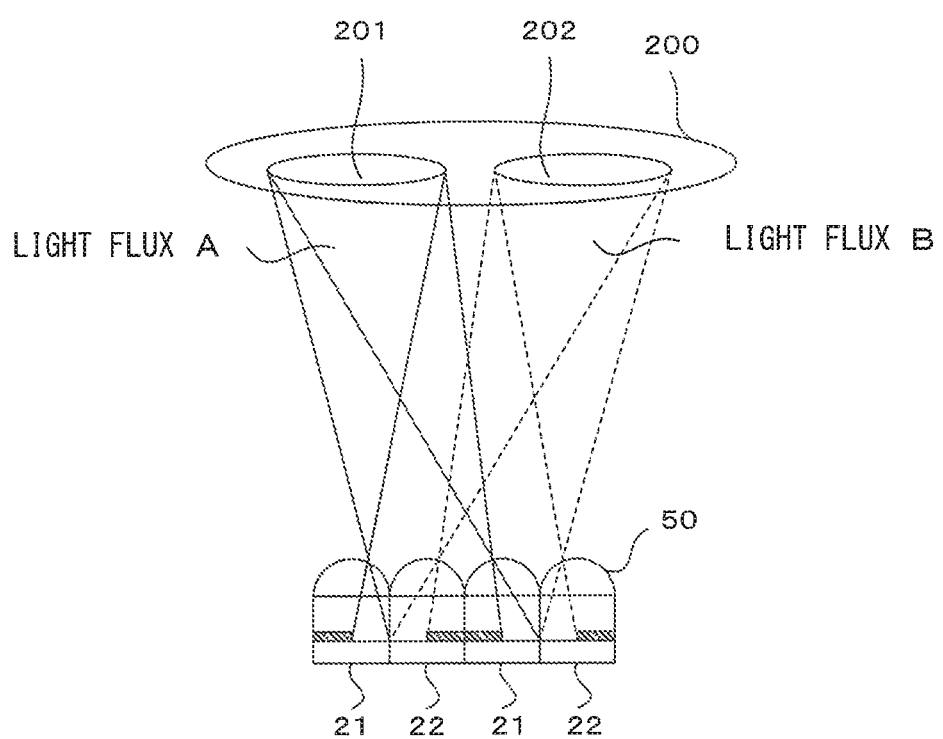
FIG. 6 illustrates how focus detection is executed through the split-pupil phase detection method.

Next, the focus detection processing executed based upon output signals provided from the image sensor 12 will be explained. As illustrated in FIG. 6, a light flux (light) A passing through a first area 201 of an exit pupil 200 of the interchangeable lens 2 enters right-opening focus detection pixels 21 and a light flux (light) B passing through a second area 202 of the exit pupil 200 enters left-opening focus detection pixels 22.

In a focus match state in which a sharp image is formed at the image sensor 12, a pair of images formed with the light fluxes from the different pupil positions of the split pupil described above, match each other. Namely, a signal waveform (i.e., a signal string a1, a2, a3, a4 . . . ) obtained through the plurality of right-opening focus detection pixels having received the light flux A and a signal waveform (i.e., a signal string b1, b2, b3, b4 . . . ) obtained through the plurality of left-opening focus detection pixels achieve a match in their shapes.

In contrast, in a non-focus match state, in which a sharp image is formed further frontward relative to the image sensor 12 or further rearward relative to the image sensor 12, the pair of images formed with light fluxes resulting from the pupil splitting do not match each other on the image sensor 12. Under these circumstances, the positional relationship (the image shift direction and the image shift quantity) between the signal waveform (the signal string a1, a2, a3, a4, . . . ) obtained through the right-opening focus detection pixels and the signal waveform (the signal string b1, b2, b3, b4, . . . ) obtained through the left-openings focus detection pixels is affected by the extent of deviation relative to the focus match state (i.e., the defocus quantity).

The body control unit 14 calculates the focusing condition (defocus quantity) at the interchangeable lens 2 based upon the positional relationship between the signal waveform (the signal string a1, a2, a3, a4, . . . ) obtained through the right-opening focus detection pixels and the signal waveform (the signal string b1, b2, b3, b4, . . . ) obtained through the left-opening focus detection pixels, and transmits the calculation results to the lens control unit 5 where they are used as camera information. Based upon the camera information, the lens control unit 5 drives the focusing lens 7 forward/backward along the optical axis and thus, focus is adjusted so as to form a sharp image on the image sensor 12.

(Image Signal Generation Processing)

Figure 7A:
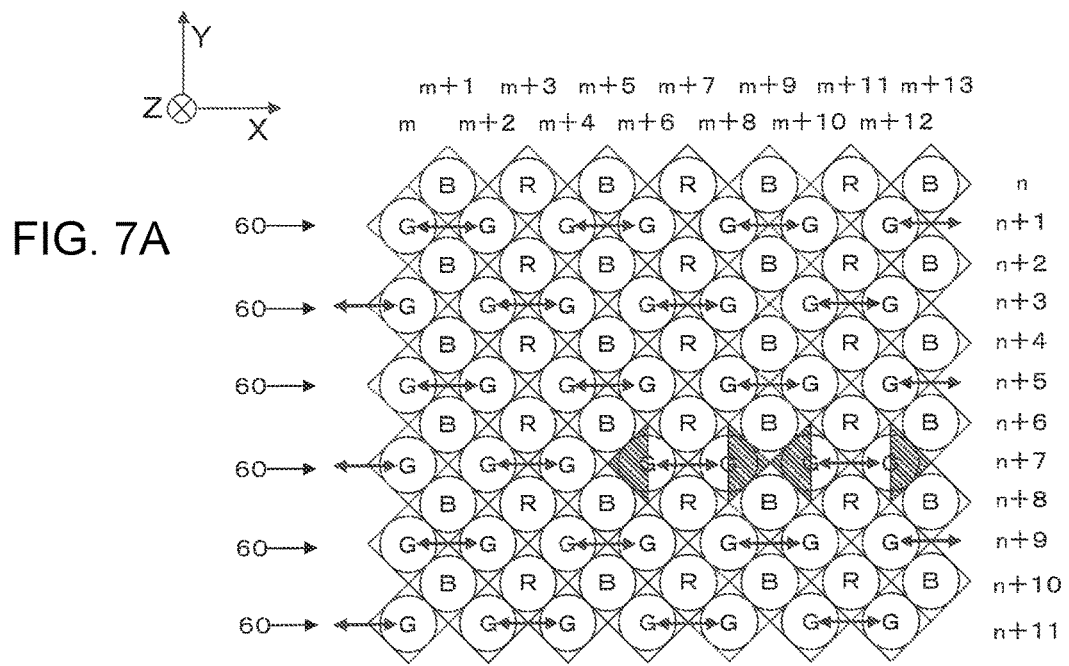
FIGS. 7(A) and 7(B) illustrate how G image signals are generated.
Figure 7B:
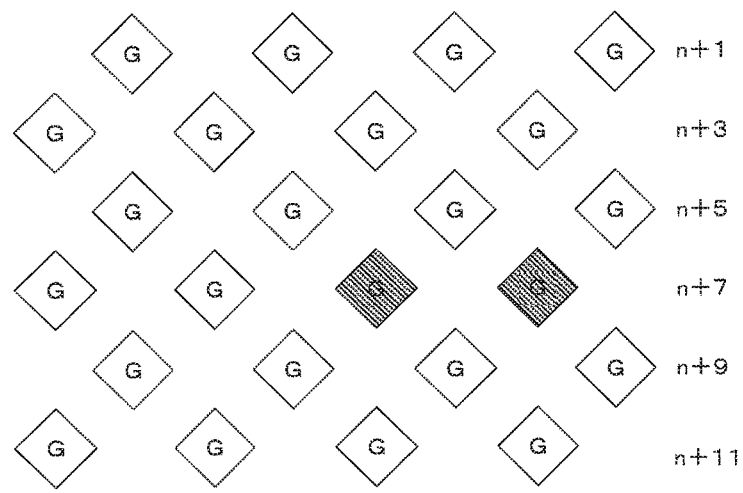

Next, in reference to FIGS. 7(A) through 9, the image signal generation processing executed to generate color image signals based upon output signals provided from the image sensor 12 will be explained. FIGS. 7(A) and 7(B) illustrate how G image signals are generated. Double-headed arrows in FIG. 7(A) each indicate a set of G pixels, the signals output from which are added together. FIG. 7(B) illustrates G image signals obtained as a result of the addition operation. The body control unit 14, executing the image signal generation processing, generates G image signals by adding together the output signals from two G pixels set next to each other along the X direction in each first pixel row 60.

In more specific terms, the body control unit 14 adds the output signal from a G pixel located at an mth position along the X direction and an (n+1)th position along the Y direction (hereafter notated as a G(m, n+1) pixel) and the output signal from a G(m+2, n+1) pixel in the first pixel row 60 taking up the (n+1)th position along the Y direction, so as to generate a G image signal corresponding to a G(m+1, n+1) pixel. Likewise, the body control unit 14 adds the output signal from a G(m+4, n+1) pixel and the output signal from a G(m+6, n+1) pixel so as to generate a G image signal corresponding to a G(m+5, n+1) pixel. In this manner it generates G image signals corresponding to a G(m+9, n+1) pixel, a G(m+13, n+1) pixel, a G(m+17, n+1) pixel and so forth in the first pixel row 60 taking up the (n+1)th position along the Y direction.

In addition, the body control unit 14 adds the output signal from a G(m+2, n+3) pixel and the output signal from a G(m+4, n+3) pixel in the first pixel row 60 taking up the (n+3)th position along the Y direction, so as to generate a G image signal corresponding to a G(m+3, n+3) pixel. Likewise, the body control unit 14 adds the output signal from a G(m+6, n+3) pixel and a G(m+8, n+3) pixel so as to generate a G image signal corresponding to a G(m+7, n+3) pixel. In this manner it generates G image signals corresponding to a G(m+11, n+3), a G(m+15, n+3) pixel, a G(m+19, n+3) pixel and so forth in the first pixel row 60 taking up the (n+3)th position along the Y direction.

In addition, the body control unit 14 generates G image signals in the first pixel rows 60 at the (n+5)th position, the (n+9)th position, the (n+13)th position and so forth along the Y direction in much the same way as that in which it generates G image signals in the first pixel rows 60 at the (n+1)th position along the Y direction, as described above, and generates G image signals in the first pixel rows 60 the (n+7)th position, the (n+11)th position and the (n+15)th position along the Y direction in much the same way as that in which it generates G image signals in the first pixel rows 60 at the (n+3)th position along the Y direction. Namely, the sets of G pixels, the signals output from which are added together in a given first pixel row 60, and the sets of G pixels, the output signals from which are added together in the first pixel row 60 arranged at the position next to the given first pixel row along the Y direction are offset relative to each other along the X direction by an extent equivalent to a single G pixel. As a result, G image signals corresponding to a G pixel array that includes a plurality of G pixel rows, each formed with a plurality of G pixels arranged along the X direction with a four-pixel pitch, set side-by-side along the Y direction with each pair of successive G pixel rows formed next to each other along the Y direction offset relative to each other along the X direction by an extent equivalent to a two-pixel pitch, are generated as illustrated in FIG. 7(B).

In addition, a G(m+6, n+7) pixel and a G(m+10, n+7) pixel in FIG. 7(A) are right-opening focus detection pixels, whereas a G(m+8, n+7) pixel and a G(m+12, n+7) pixel in FIG. 7(A) are left-opening focus detection pixels. The body control unit 14 generates G image signals in conjunction with the focus detection pixels through a similar process, each by adding together the output signal from the right-opening focus detection pixel and the output signal from the left-opening focus detection pixel next to the right-opening focus detection pixel along the X direction. Namely, the body control unit 14 generates a G image signal corresponding to a G(m+7, n+7) pixel by adding together the output signal from the G(m+6, n+7) pixel and the output signal from the G(m+8, n+7) pixel, and generates a G image signal corresponding to a G(m+11, n+7) pixel by adding together the output signal from the G(m+10, n+7) pixel and the output signal from the G(m+12, n+7) pixel. It is to be noted that the G(m+n+7) pixel and the G(m+11, n+7) pixel are shaded in FIG. 7(B).

The G image signals corresponding to the G(m+7, n+7) pixel and the G(m+11, n+7) pixel are each generated by adding together the output signal from the right-opening focus detection pixel and the corresponding left-opening focus detection pixel with the shielded half areas and, for this reason, these G image signals achieve an output level half the output level of a signal generated by adding together the output signals from two image-capturing pixels. Accordingly, a G image signal with an output level equivalent to that of a G image signal generated by adding together the output signals from two image-capturing pixels can be obtained by multiplying the signal resulting from the addition of the output signal from a right-opening focus detection pixel and the output signal from the corresponding left-openings focus detection pixel, by 2. Thus, in conjunction with the focus detection pixels, the body control unit 14 generates G image signals each by adding together the output signals from a pair of focus detection pixels arranged at successive positions along the X direction, in much the same way as adding together the output signals from two image-capturing pixels arranged next to each other, and then multiplying the signal representing the sum by 2.

Figure 8A:
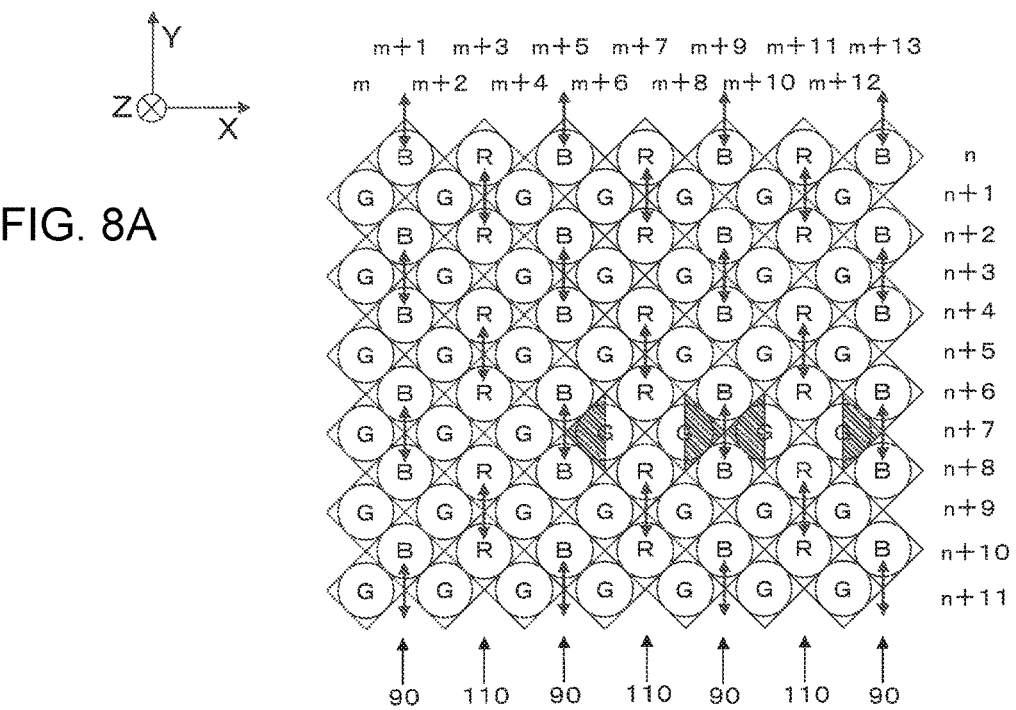
FIGS. 8(A) and 8(B) illustrate how B image signals and R image signals are generated.
Figure 8B:
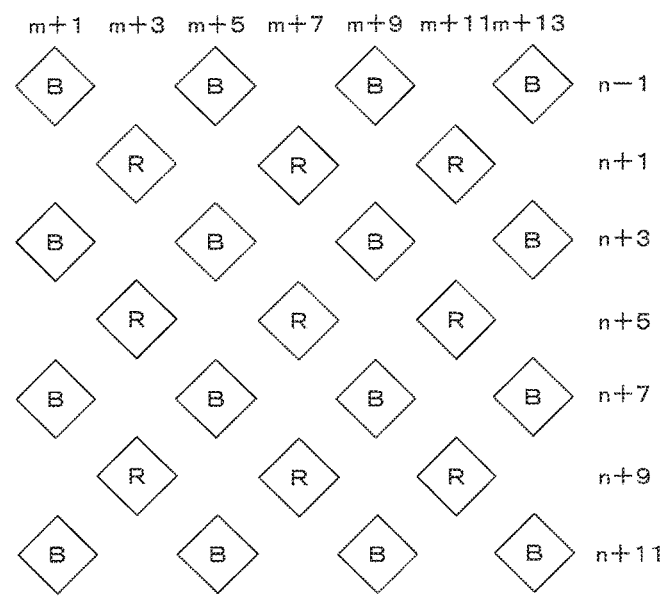

FIGS. 8(A) and 8(B) illustrate how B image signals and R image signals are generated. Double-headed arrows in FIG. 8(A) each indicate a set of B pixels or R pixels, the signals output from which are added together. FIG. 8(B) illustrates B image signals and R image signals obtained as a result of the addition operation. The body control unit 14, executing the image signal generation processing, generates B image signals each by adding together the output signals from two B pixels set next to each other along the Y direction in a fourth pixel row 90. In addition, the body control unit 14 generates R image signals by adding together the output signals from two R pixels set next to each other along the Y direction in a sixth pixel row 110.

In more specific terms, the body control unit 14 adds the output signal from a B pixel located at an (m+1)th position along the X direction and an (n+2)th position along the Y direction (hereafter notated as a B(m+1, n+2) pixel) and the output signal from a B(m+1, n+4) pixel in the fourth pixel row 90 taking up the (m+1)th position along the X direction, so as to generate a B image signal corresponding to a B(m+1, n+3) pixel. Likewise, the body control unit 14 adds the output signal from a B(m+1, n+6) pixel and the output signal from a G(m+1, n+8) pixel so as to generate a B image signal corresponding to a B(m+1, n+7) pixel. In this manner it generates B image signals corresponding to a B(m+1, n+11) pixel, a B(m+1, n+15) pixel, a B(m+1, n+9) pixel and so forth in the fourth pixel row 90 taking up the (m+1)th position along the X direction. The body control unit 14 generates B image signals in the fourth pixel rows 90 at the (m+5)th position, the (m+9)th position the (m+13)th position, and so forth along the X direction, in much the same way as that in which it generates B image signals in the fourth pixel row 90 at the (m+1)th position along the X direction, as described earlier.

In addition, the body control unit 14 adds the output signal from an R pixel located at an (m+3)th position along the X direction and an nth position along the Y direction (hereafter notated as an R(m+3, n) pixel) and the output signal from an R(m+3, n+2) pixel in the sixth pixel row 110 taking up the (m+3)th position along the X direction, so as to generate R image signal corresponding to an R(m+3, n+1) pixel. Likewise, the body control unit 14 adds the output signal from an R(m+3, n+4) pixel and the output signal from an R(m+3, n+6) pixel so as to generate an R image signal corresponding to an R(m+3, n+5) pixel. In this manner it generates R image signals corresponding to an R(m+3, n+9) pixel, an R(m+3, n+13) pixel, an R(m+3, n+17) pixel and so forth in the fourth pixel row 90 taking up the (m+3)th position along the X direction. The body control unit 14 generates R image signals in the sixth pixel rows 110 at the (m+7)th position, the (m+11)th position, the (m+15)th position, and so forth along the X direction, in much the same way as that in which it generates R image signals in the sixth pixel row 110 at the (m+3)th position along the X direction as described earlier.

Namely, the body control unit 14 offsets the sets of B pixels in the fourth pixel rows 90, the output signals from which are added together, and the sets of R pixels in the sixth pixel rows 110, the output signals from which are added together, relative to each other along the Y direction by an extent equivalent to a single B pixel or R pixel. As a result, B image signals and R image signals forming a pixel array that includes a plurality of B pixel rows, each formed with a plurality of B pixels arranged along the X direction with a four-pixel pitch and a plurality of R pixel rows each formed with a plurality of R pixels arranged along the X direction with the four-pixel pitch set at alternate positions along the Y direction with each pair of the B pixel row and the R pixel row formed next to each other along the Y direction offset relative to each other along the X direction by an extent equivalent to a two-pixel pitch, are generated as illustrated in FIG. 8(B).

Furthermore, the sets of B pixels and the sets of R pixels, the output signals from which are to be added together, are set by ensuring that the positions of the pixels corresponding to the B image signals and the R image signals generated as a result of the addition operation do not overlap the positions of the pixels corresponding to the G image signals generated as a result of adding together the output signals from the G pixels in the individual G pixel sets, as described earlier. For instance, if the output signal from the B(m+1, n) pixel and the output signal from the B(m+1, n+2) pixel were added together, a B image signal corresponding to a B(m+1, n+1) pixel would be generated and the position of this B(m+1, n+1) pixel would overlap the position of a G image signal generated for a G(m+1, n+1) pixel by adding together the output signal from the G(m, n+1) pixel and the G(m+2, n+1) pixel. In order to avoid such an overlap of pixel positions of the G image signal and the B image signal, a B image signal is generated for the B(m+1, n+3) pixel by adding together the output signal from the B(m+1, n+2) pixel and the output signal from the B(m+1, n+4) pixel.

Figure 9:
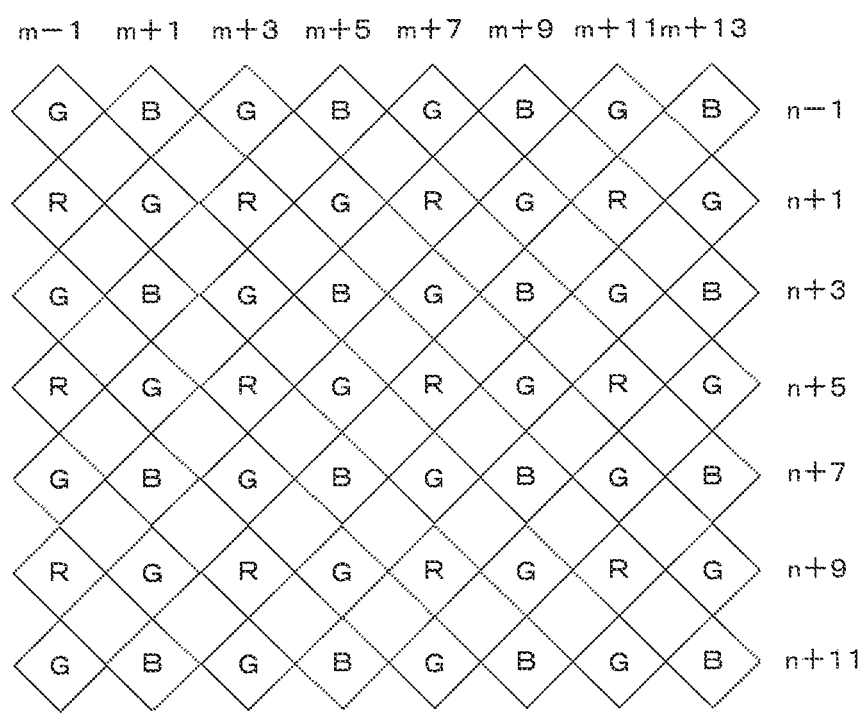
FIG. 9 illustrates image signals output in a Bayer array.

The body control unit 14 combines the G image signals, the B image signals and the R image signals generated as described above and, as a result, image signals in a square Bayer array, such as that illustrated in FIG. 9, are obtained. It is to be noted that the number of pixels corresponding to the image signals thus obtained is half the number of pixels arranged at the image sensor 12.

The body control unit 14 then executes color interpolation processing for the image signals in the Bayer array obtained as described above so as to generate image signals corresponding to the missing color components. A detailed explanation of the color interpolation processing executed for the Bayer array image signals, which is of the known art, will not be provided. Through this color interpolation processing, color image signals (RGB signals) are obtained. The body control unit 14 generates an image file for purposes of, for instance, recording, by using these color image signals, and records the image file thus generated into the memory card 20.

The following operations and advantages are achieved through the embodiment described above.

(1) The image sensor 12 includes a pixel group made up with a plurality of pixels that receive light fluxes having passed through the interchangeable lens 2. The pixel group includes G pixels, B pixels and R pixels respectively assuming first spectral sensitivity, second spectral sensitivity and third spectral sensitivity different from one another. At the image sensor 12, a plurality of first pixel rows 60, each made up with a plurality of G pixels arranged one after another along the horizontal direction, and a plurality of second pixel rows 70, each made up with a plurality of B pixels and a plurality of R pixels arranged at alternate positions along the horizontal direction, are arranged at alternate positions along the vertical direction, with the first pixel rows 60 offset relative to the second pixel rows 70 along the horizontal direction by an extent approximately equal to a half pitch. In at least some of the plurality of first pixel rows 60, a plurality of focus detection pixels assuming the first spectral sensitivity are arranged in place of at least some G pixels, and the plurality of focus detection pixels are structured so as to receive a pair of light fluxes having passed through a pair of areas of a pupil of the interchangeable lens 2 and output a pair of image signals corresponding to a pair of images formed with the pair of light fluxes. These structural features allow the focus detection pixels to be arranged at successive positions and thus achieve an improvement in focus detection accuracy without complicating the process of interpolation processing executed to generate, through interpolation, image signals at positions corresponding to the focus detection pixels.

(2) The image sensor 12 includes a pixel group made up with a plurality of pixels that receive light fluxes having passed through the interchangeable lens 2. The pixel group includes U pixels, B pixels and R pixels respectively assuming first spectral sensitivity, second spectral sensitivity and third spectral sensitivity different from one another. At the image sensor 12, a plurality of pixel row sets 120, each includes a third pixel row 80 made up with a plurality of G pixels arranged one after another along the vertical direction, a fourth pixel row 90 set directly rightward relative to the third pixel row 80 and made up with a plurality of B pixels arranged one after another along the vertical direction, a fifth pixel row 100 set directly rightward relative to the fourth pixel row 90 and made up with a plurality of G pixels arranged one after another along the vertical direction and a sixth pixel row 110 set directly rightward relative to the fifth pixel row 100 and made up with a plurality of R pixels arranged one after another along the vertical direction, are arranged one after another along the horizontal direction. Each pixel row among the third through sixth pixel rows 80 through 110 is arranged with an offset relative to the next pixel row along the vertical direction by an extent approximately equal to a half pitch. In at least some of the plurality of third pixel rows 80 and the plurality of fifth pixel rows 100, a plurality of focus detection pixels assuming the first spectral sensitivity are arranged in place of at least some G pixels, and the plurality of focus detection pixels are structured so as to receive a pair of light fluxes having passed through a pair of areas of the pupil of the interchangeable lens 2 and output a pair of image signals corresponding to a pair of images formed with the pair of light fluxes. These structural features allow the focus detection pixels to be arranged at successive positions and thus achieve an improvement in focus detection accuracy without complicating the process of interpolation processing executed to generate, through interpolation, image signals at positions corresponding to the focus detection pixels.

(3) The unit pixels 20 in the image sensor 12 described in (1) or (2) above assume a square shape in a plan view, with each side thereof inclining by approximately 45° relative to the X direction and the Y direction. As a result, a higher aperture ratio is assured at the unit pixels 20, which, in turn, makes it possible to improve the focus detection accuracy. In other words, the image sensor 12 can be provided as a more compact unit without lowering the aperture ratio.

(4) The digital camera 1 includes the image sensor 12 described in (1) or (2) above, a body control unit 14 that generates Bayer array signals by adding together the output signals from two G pixels arranged next to each other along the horizontal direction, adding together the output signals from two B pixels set next to each other along the vertical direction and adding together the output signals from two R pixels set next to each other along the vertical direction, and a body control unit 14 that generates color image signals based upon the Bayer array signals. In the digital camera 1 configured as described above, the existing image processing engine enabling color interpolation processing on Bayer array image data can be used for the color interpolation processing executed therein.

(5) The image sensor 12 in the digital camera described in (4) above includes right-opening focus detection pixels 21 that receive a light flux having passed through a first area 201 of the exit pupil 200 of the interchangeable lens 2 and left-opening focus detection pixels 22 that receive a light flux having passed through a second area 202 of the exit pupil 200 of the interchangeable lens 2. The plurality of right-opening focus detection pixels 21 and the plurality of left-opening focus detection pixels 22 are arranged at alternate positions. The body control unit 14 adds together the output signal from the right-opening focus detection pixel 21 and the output signal from the left-opening focus detection pixel 22 arranged next to the right-opening focus detection pixel 21 along the horizontal direction, multiplies the signal resulting from the addition operation by a predetermined factor (twice), and generates color image signals based upon signals each resulting from the multiplication operation and the Bayer array signals. Through these measures, image signals can be generated with ease simply by using the output signals provided from the focus detection pixels.

(Variation 1)

In the embodiment described above, focus detection pixels are arranged in place of some of the G pixels in the third pixel rows 80 and the fifth pixel rows 100. As an alternative, however, the present invention may be adopted in conjunction with third pixel rows 80 and fifth pixel rows 100 each entirely made up with focus detection pixels, as illustrated in FIGS. 10(A) and 10(B).

Figure 10A:
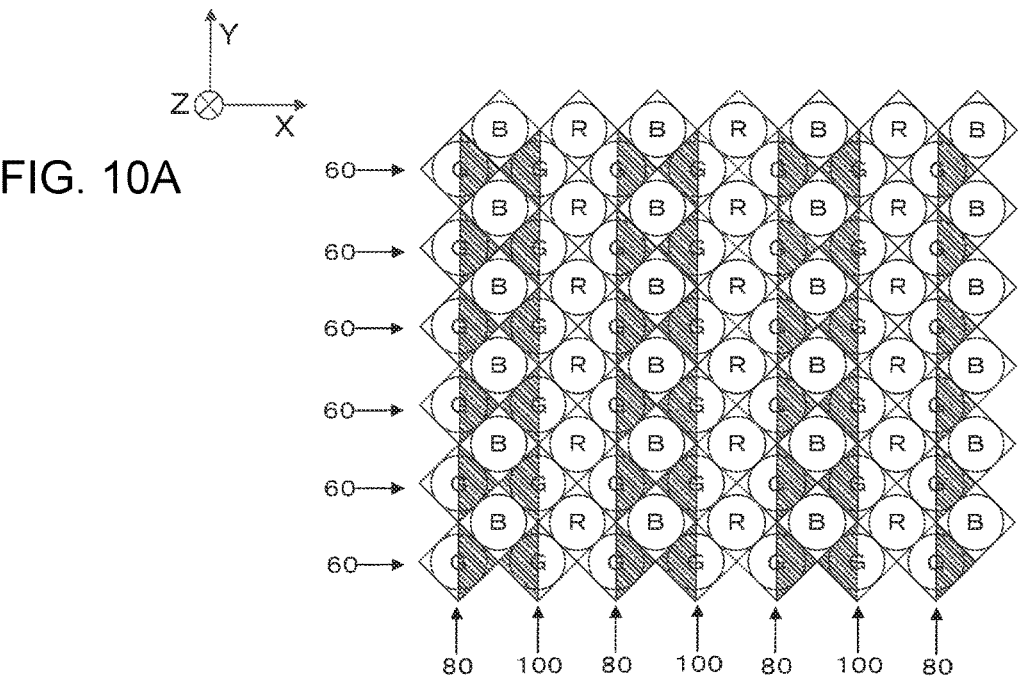
FIGS. 10(A) and 10(B) are views presenting examples of positional arrangements with which the focus detection pixels may be arranged in Variation 1.

For instance, the third pixel rows 80 may each be entirely made up with left-opening focus detection pixels and the fifth pixel rows 100 may each be made up entirely with right-opening focus detection pixels, as illustrated in FIG. 10(A). In this configuration, a left-opening focus detection pixel and a right-opening focus detection pixel are set at alternate positions, in reiteration along the X direction in each first pixel row 60.

Figure 10B:
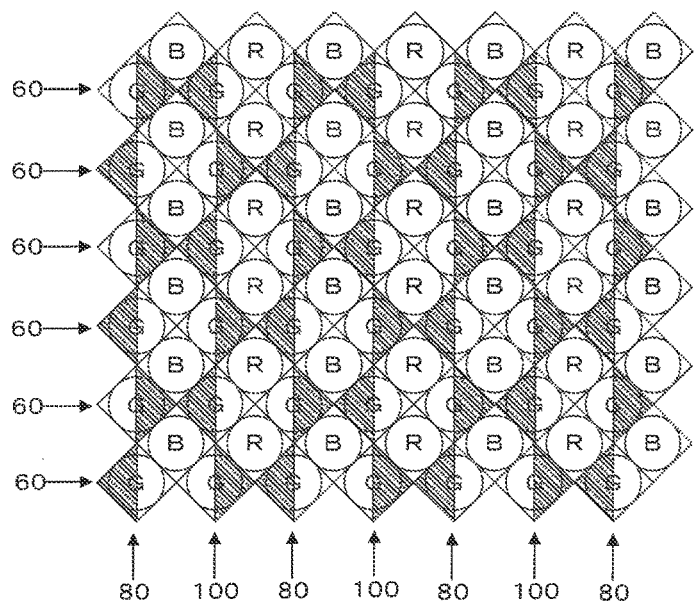

As a further alternative, left-opening focus detection pixels and right-opening focus detection pixels may be arranged at alternate positions along the Y direction in the third pixel rows 80 and left-opening focus detection pixels and right-opening focus detection pixels may be arranged at alternate positions along the Y direction in the fifth pixel rows 100 as well, as illustrated in FIG. 10(B). The focus detection pixels in this configuration are arranged so that each first pixel row 60 includes a left-opening focus detection pixel and a right-opening focus detection pixel set at alternate positions, in reiteration along the X direction.

In variation 1, which includes focus detection pixels arranged through the entire image sensor 12, focus detection can be executed at any position on the photographic image plane without having to execute focus detection in a limited focus detection area.

(Variation 2)

In the embodiment described above, the image shift quantity is calculated along the X direction via the left-opening focus detection pixels and the right-opening focus detection pixels and thus, the defocus quantity is detected along the X direction. However, the present invention may be adopted in conjunction with upper-opening focus detection pixels, each having the upper half of the photoelectric conversion unit 30 thereof remaining unshielded and lower-opening detection pixels each having the lower half of the photoelectric conversion unit 30 thereof remaining unshielded so as to calculate an image shift quantity along the Y direction and detect the defocus quantity along the Y direction.

In this variation, upper-opening focus detection pixels and lower-opening focus detection pixels are arranged at alternate positions along the Y direction in place of at least some of the G pixels in a third pixel row 80 and a fifth pixel row 100. In addition, at least two focus detection pixel rows, each made up with focus detection pixels arranged one after another along the Y direction, are arranged next to each other along the X direction so that the upper-opening focus detection pixels and the lower-opening focus detection pixels are also set at alternate positions along the X direction. As a result, by adding together the output signal from the upper-opening focus detection pixel and the output signal from the lower-opening focus detection pixel present directly next to the upper-opening focus detection pixel along the X direction and then multiplying the sum by 2, as in the embodiment described earlier, a G image signal equivalent to that output from an image-capturing pixel can be generated.

Furthermore, the image sensor 12 may include upper-opening focus detection pixels and lower-opening focus detection pixels in addition to left-opening focus detection pixels and right-opening focus detection pixels.

(Variation 3)

At each focus detection pixel in the embodiment described above, half of the photoelectric conversion unit 30 remains unshielded or open. However, the present invention is not limited to this example and it may be adopted in conjunction with focus detection pixels each equipped with two photoelectric conversion units. The two photoelectric conversion units in the focus detection pixel individually receive the pair of light fluxes having passed through the pair of areas at the exit pupil 200 of the interchangeable lens 2.

(Variation 4)

The micro-lenses in the unit pixels 20 in the embodiment described above assume a shape achieved by cutting off a spherical lens on four sides, as illustrated in FIG. 4(A). However the present invention is not limited to this example and it may be adopted in conjunction with spherical micro-lenses.

(Variation 5)

The unit pixels 20 in the embodiment described above take on a substantially square shape. However, the present invention is not limited to this example and it may instead be adopted in conjunction with unit pixels assuming an octagonal shape that includes four sides inclining by 45° relative to the X direction and the Y direction.

In addition, while the unit pixels 20 in the embodiment described above are arranged with an orientation achieved by rotating the sides thereof by approximately 45° relative to the X direction and the Y direction, the present invention is not limited to this example and the unit pixels 20 may each be arranged with an orientation allowing each side thereof to extend parallel to the X direction or the Y direction. In this case, too, the adjacent unit pixels 20 should be offset relative to each other by a half pitch so as to achieve a staggered positional arrangement.

(Variation 6)

While the image sensor 12 in the embodiment described above includes primary (RUB) color filters, the present invention may be adopted in conjunction with complementary (CMY) color filters.

(Variation 7)

In the embodiment described above, the present invention is adopted in the digital camera 1 with the interchangeable lens 2 mounted at the camera body 3. However, the present invention is not limited to this example and it may be adopted in a digital camera having an integrated lens.

It is to be noted that the embodiment described above simply represents an a example and the present invention is in no way limited to the structural particulars of the embodiment as long as the features characterizing the present invention remain intact. In addition, structures achieved in the variations may be adopted in conjunction with the embodiment in any combination.

The invention claimed is:

1. An image sensor upon which light having passed through an optical system is incident, the image sensor comprising:
   a first pixel and a second pixel that generate signals used for focus adjustment of the optical system and used for image generation by being added together from light incident thereon, each of the first and second pixels having a filter of a first spectral characteristic and through which the incident light passes; and
   a third pixel and a fourth pixel that generate signals used for image generation from light incident thereon, each of the third and fourth pixels having a filter of a second spectral characteristic, which is different from the first spectral characteristic, and through which the incident light passes, wherein:
   a distance between the first pixel and the second pixel is greater than both a distance between the first pixel and the third pixel and a distance between the second pixel and the fourth pixel.

2. The image sensor according to claim 1, wherein:
   the first pixel and the second pixel are arranged in a first direction;
   the third pixel and the fourth pixel are arranged in a second direction intersecting the first direction; and
   (i) the first pixel and the third pixel or (ii) the second pixel and the fourth pixel are arranged in a third direction that intersects the first and second directions.

3. The image sensor according to claim 2, wherein:
   a distance between the third pixel and the fourth pixel in the second direction is greater than both the distance between the first pixel and the third pixel in the third direction and the distance between the second pixel and the fourth pixel in the third direction.

4. The image sensor according to claim 2, further comprising:
   a fifth pixel and a sixth pixel that are arranged in the second direction and that generate signals used for image generation from light incident thereon, each of the fifth and sixth pixels having a filter of a third spectral characteristic, which is different from the first and second spectral characteristics, and through which the incident light passes.

5. The image sensor according to claim 4, wherein:
   the fifth pixel and the sixth pixel are arranged in the second direction in order.

6. The image sensor according to claim 4, wherein:
   the second pixel, the fourth pixel and the fifth pixel are arranged adjacently in the third direction.

7. The image sensor according to claim 4, wherein:
a distance between the first pixel and the second pixel is greater than both a distance between the second pixel and the fourth pixel and a distance between the second pixel and the fifth pixel.

8. The image sensor according to claim 4, wherein:
a distance between the fifth pixel and the sixth pixel in the second direction is greater than both a distance between the first pixel and the third pixel in the third direction and a distance between the second pixel and the fourth pixel in the third direction.

9. The image sensor according to claim 4, wherein:
the signals generated by the fifth pixel and the sixth pixel are added together to be used for image generation.

10. The image sensor according to claim 2, wherein:
the first direction and the second direction are perpendicular to each other.

11. The image sensor according to claim 2, wherein:
(i) the first pixel and the third pixel, and (ii) the second pixel and the fourth pixel, are arranged in the third direction so as to be adjacent to each other.

12. The image sensor according to claim 2, wherein:
the first pixel and the second pixel are arranged in the first direction in order.

13. The image sensor according to claim 2, wherein:
a distance between the first pixel and the second pixel in the first direction is greater than both a distance between the first pixel and the third pixel in the third direction and a distance between the second pixel and the fourth pixel in the third direction.

14. The image sensor according to claim 1, wherein:
the first pixel, the second pixel, the third pixel and the fourth pixel each include a photoelectric converter that converts light to an electric charge;
the photoelectric converter of the first pixel and the photoelectric converter of the second pixel each receive light through a first opening; and
the photoelectric converter of the third pixel and the photoelectric converter of the fourth pixel each receive light through a second opening which has a larger opening area than the first opening.

15. The image sensor according to claim 1, wherein:
the first pixel and the second pixel each include a photoelectric converter that converts light to an electric charge and a light shielding member that shields a part of the light that is incident on the photoelectric converter.

16. The image sensor according to claim 1, wherein:
the signals generated by the third pixel and the fourth pixel are used for image generation by being added together.

17. An image-capturing device, comprising:
the image sensor according to claim 1.

* * * * *